S. S. STOKES.
Churn.
No. 79,409.
Patented June 30, 1868.
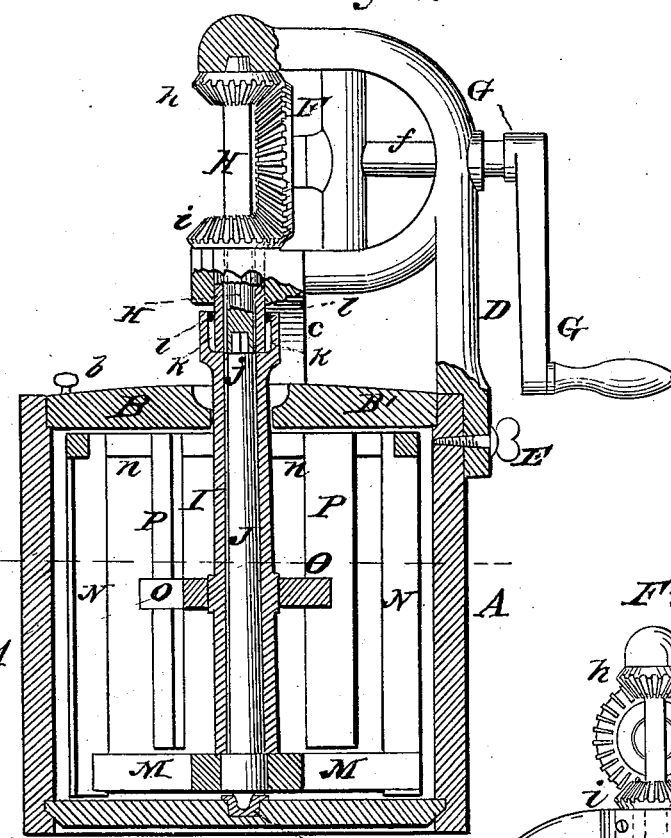
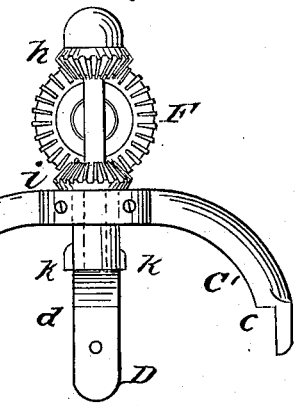
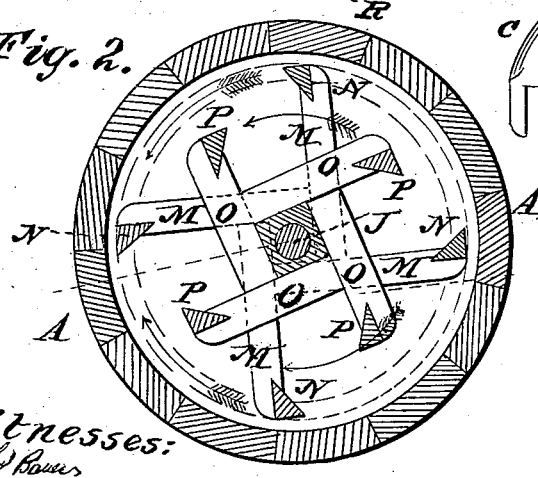
Witnesses:
Inventor:

United States Patent Office.

SAMUEL S. STOKES, OF WESTBORO, OHIO.

Letters Patent No. 79,409, dated June 30, 1868.

IMPROVEMENT IN CHURNS.

*The Schedule referred to in these Letters Patent and making part of the same.*

TO WHOM IT MAY CONCERN:

Be it known that I, SAMUEL S. STOKES, of Westboro, in the county of Clinton, and State of Ohio, have invented certain new and useful Improvements in Churns; and do hereby declare the following to be a full, clear, and exact description thereof, reference being had to the accompanying drawings, making part of this specification.

My invention relates principally to the construction and arrangement of the dashers, which consist of two distinct series of vertical triangular slats or blades attached to horizontal arms that project from two separate shafts, and by means of suitable gearing, these two shafts, with their accompanying arms and triangular slats, are compelled to rotate in opposite directions, by which means the most thorough agitation of the cream is effected, and a superior article of butter is produced in a few minutes, and with the least amount of exertion.

In the accompanying drawings—

Figure 1 is a vertical section through a churn provided with my improved form of dasher.

Figure 2 is a horizontal section of the same taken at the line X X; and

Figure 3 is an elevation of the driving-mechanism and the devices by which it is attached to the churn.

The barrel A of the churn is of the customary cylindrical form, and it is provided with two lids, B B', having handles b, which permit of their ready removal.

The gearing by which the dashers are operated is journalled in a tripod-frame, C C' D, and the legs of this frame have shoulders, c c' d, which rest upon the top of the churn-barrel. This frame is prevented from being accidentally detached from the churn-barrel by means of the screw E, which, being inserted in the leg D, near its lower end, engages with the barrel, and by simply withdrawing said screw, the frame and its accompanying gearing can be detached from the churn.

The gearing consists of a spur-wheel, F, having a shaft, f, and winch G, and this spur-wheel drives two pinions, h and i, which are attached respectively to the shaft H and sleeve I. The shaft H has a recess in its lower end, for the reception of the driving-arbor j of the inner shaft, J, of the dashers, and the sleeve I has outwardly-projecting lugs K K', which enter suitable grooves, l l', in the upper end of the hollow and outer shaft, L, of the dashers.

It will be seen that this arrangement of spur-wheel F, pinions h i, shaft H, sleeve I, arbor j, lugs K K', and grooves l l', permits of the two dasher-shafts, J and L, being rotated in opposite directions, and these different parts can all be separated and removed from the churn by simply withdrawing the screw E.

The inner shaft, J, carries horizontal arms, M, to which are attached vertical blades N, whose upper ends are united by the hoop n, and the outer shaft, L, is provided with similar arms, O, and blades P, the blades N P being triangular in their horizontal section, and being so attached to their arms as for both sets to strike the cream flatly and with a clipping action in one direction of rotation, and obliquely, and with less abruptness, in the other direction; the former, here represented by red arrows, being the direction employed for churning, and the latter, by blue arrows, being employed for gathering the butter.

R is a step at the bottom of the churn, for the reception of the lower end of the inner shaft, J.

In churning, the winch G is turned towards the right, which causes the two sets of arms, M O, and dashers N P, to revolve in opposite directions, as shown by the red arrows in fig. 2, which produces the most violent agitation of the cream, and as the edges of the two sets of blades pass each other with a clipping or shearing action, the cream is thoroughly broken up, and the butter commences to form in a few minutes.

After the butter has formed, the winch is turned towards the left, which compels the arms and blades to rotate in the reverse direction, as indicated by blue arrows, thus presenting oblique surfaces to the cream, and collecting the butter upon said arms and blades.

By simply withdrawing the screw E, the tripod-frame C C' D, gearing F h i, shaft H, and sleeve I, can be lifted bodily from the churn, and the dashers taken out, for the purpose of removing the butter and cleansing the apparatus.

I am aware that it is common to impart opposite rotation to a pair of dashers by means of gearing and two concentric shafts; but

I claim, and desire to secure by Letters Patent—

1. The outer dasher, consisting of blades N N, annulus $n$, and shafts M, connected at the bottom to the central shaft J, in combination with the inner dasher, consisting of blades P P mounted upon arms O O, deriving rotation from the hollow shaft L and sleeve I, all substantially as herein described.

2. In combination with the described elements of the preceding clause, I also claim the detachable tripod-frame C C' D, $c\ c\ d$, and screw E, for the object explained.

3. I further claim the triangular construction of the dashers N and P, when said dashers are applied and employed substantially as and for the purposes specified.

In testimony of which invention, I hereunto set my hand.

SAMUEL S. STOKES.

Witnesses:
    GEO. H. KNIGHT,
    JAMES H. LAYMAN.